I. H. MORSE.
APPARATUS FOR SEPARATING IMPURITIES FROM CANE JUICE OR OTHER LIQUIDS.
APPLICATION FILED JAN. 24, 1919.
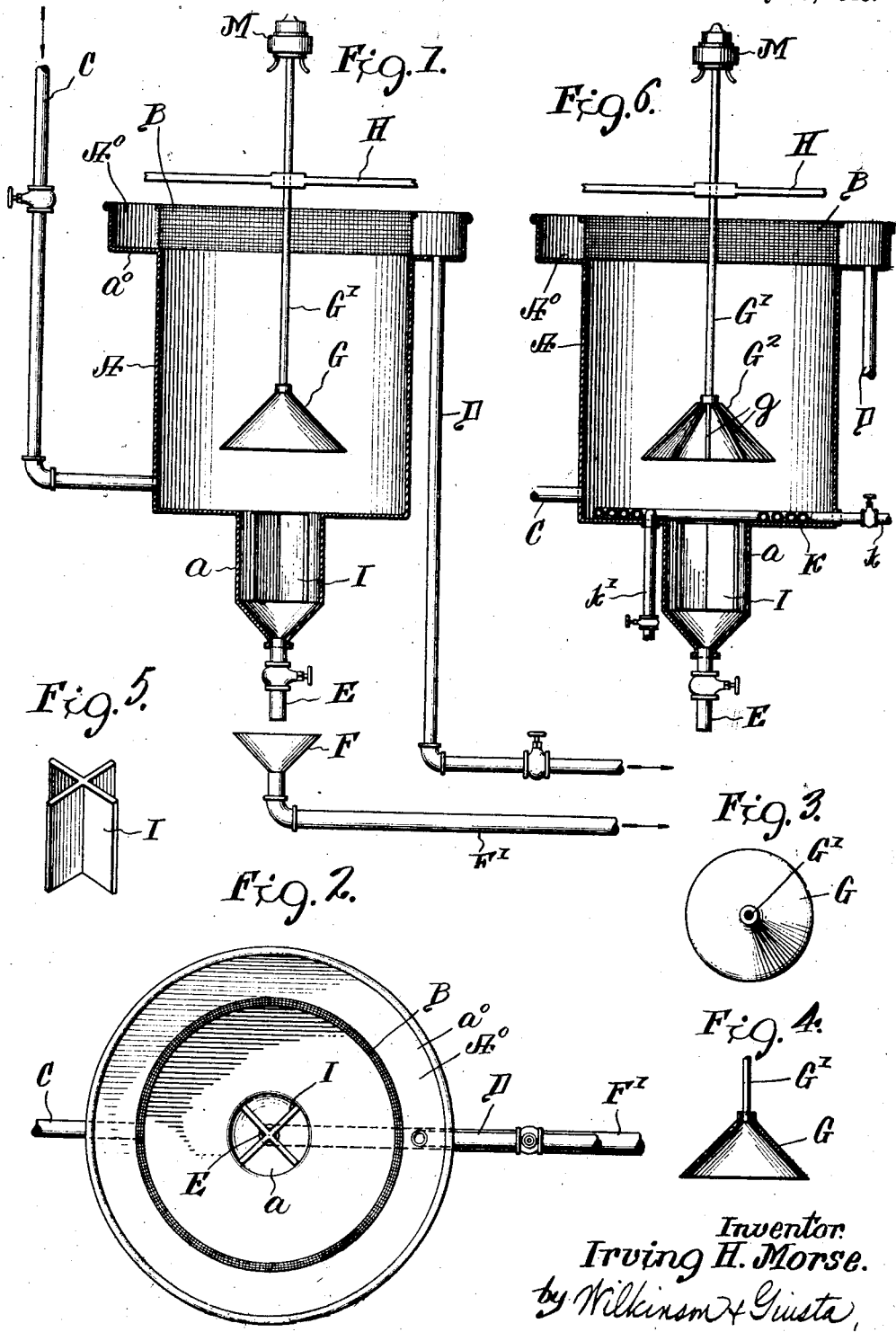
Inventor.
Irving H. Morse.
by Wilkinson & Giusta,
Attorneys.

UNITED STATES PATENT OFFICE.

IRVING H. MORSE, OF NEW ORLEANS, LOUISIANA.

APPARATUS FOR SEPARATING IMPURITIES FROM CANE-JUICE OR OTHER LIQUIDS.

1,311,831.

Specification of Letters Patent.    Patented July 29, 1919.

Application filed January 24, 1919. Serial No. 272,904.

*To all whom it may concern:*

Be it known that I, IRVING H. MORSE, a citizen of the United States, residing at New Orleans, in the parish of Orleans and State of Louisiana, have invented certain new and useful Improvements in Apparatus for Separating Impurities from Cane-Juice or other Liquids; and I do hereby declare the following to be a full, clear, and exact description of the invention, such as will enable others skilled in the art to which it appertains to make and use the same.

My invention relates to improvements in apparatus for separating solid impurities from liquids of various kinds, but is more especially intended to separate the solid particles from saccharine solutions, such as cane juice, syrup, or the like.

In cane juice as it comes from the mill there is more or less solid matter consisting mainly of finely divided particles of pith or bagasse, commonly known as "bagassillo", or waxy powder or bloom which is found on the surface of the cane stalks, and also more or less earth which adheres to the cane and is washed away in the process of extracting the juice from the cane, and carried off with the juice. Also, in the later treatment of juice there may be more or less solid particles of lime or its compounds, albumin, charcoal or other solid matter which it is desired to remove from the juice or syrup before boiling the same down to the finished product to form sugar, or molasses, or the like.

According to my invention I pass the juice or syrup into a tank where a whirling motion is imparted to the liquid, and the lighter solid particles are thrown outward and rise upward, while the heavier solid particles tend to gravitate toward the center of the tank and settle downward into a settling tank, preferably opening into the bottom of the main tank in which the liquid is given the whirling motion referred to.

The upper portion of the tank is provided with a screen which permits the liquid to flow through, but retains the lighter solid particles, such as the bagassillo, or the like, while mud, or heavier particles will gradually settle in the settling tank at the bottom of the main tank, and may be drawn off from time to time as desired.

My invention will be more fully understood after reference to the accompanying drawings, in which:—

Figure 1 is a diagram showing the separating tank in central vertical section, the other parts being shown in elevation.

Fig. 2 is a plan view of the tank shown in Fig. 1, with the member for imparting rotation to the liquid removed.

Fig. 3 is a plan view of the rotating hollow cone used for imparting rotary motion to the liquid.

Fig. 4 is a central vertical section through the cone shown in Fig. 3.

Fig. 5 is a perspective view of the baffle plate arrangement which may be used in the settling tank to prevent the whirling of the liquid therein; and Fig. 6 shows a modification which is adapted to be used in the treatment of the partly boiled syrup, and shows a steam coil in the bottom of the tank, and also shows ribs on the rotating cone to more effectually impart the rotary motion to the liquid in the tank.

A represents the main tank which is provided at its bottom with a settling tank or well *a* and at its top is flanged as at *a°* to form an annular trough A°. On the inside of this annular trough A° there is fine wire screen B which will permit the passage of the liquid therethrough, but will arrest the particles of the bagassillo, or other solid matter, which rises to the top of the tank.

The liquid is fed into the bottom of the tank through the pipe C, and is drawn off from the trough A° through the pipe D, while the mud or other sediment is drawn off from the settling tank *a* through the pipe E, and may be emptied into a funnel F if desired, which funnel is connected to the pipe F′; but this funnel F and pipe F′ may be omitted if desired.

G represents a hollow cone carried by the spindle G′, rotated in any convenient way, as by the electric motor M. This spindle is journaled in bearings in any suitable frame H.

In order to prevent the whirling motion of the liquid in the settling tank, I may provide a baffle arrangement, such as the casting I shown in detail in Fig. 5, which may be conveniently slipped into the chamber *a* and rest on the sloping bottom thereof.

In the modification shown in Fig. 6, I show the hollow cone G² as provided with ribs *g* which more effectively engage the liquid and impart a more positive whirling motion to the same.

In this figure I also show a steam coil K in the bottom of the tank A, which is supplied with steam from the pipe *k*, and the water of condensation is carried off through the pipe *k'*. This steam coil may be used in the clarification of the juice or syrup where it is desirable to heat the same, either for the purpose of solidifying the albumin, or creating the convection currents whereby the lighter particles are caused to rise to the top in the form of scum.

If the juice or syrup has been treated with lime, or sulfur, or both, before entering the tank A, the whirling motion imparted to the liquid will more thoroughly mix the lime cream and sulfurized particles with the liquid, causing a rapid and efficient mixing of the same.

When the cane juice is being treated, the sieve B at the top of the tank will soon become more or less coated with bagassillo, and this with the sieve itself will serve to filter the juice, permitting it to flow in a more or less clear state into the trough A° from which it is carried off by the pipe D. The swift currents around the outer edge will prevent the sieve from becoming clogged.

The circular motion created by the cone attachment creates a more rapid current on the outer part of the tank than at the center, and this will gradually bring the mud, dirt, etc. to the center, and it will fall into the settling tank or well, from which it can be drawn off and sent to the filter presses.

By making the well very deep and placing the steam coils on the bottom of the tank surrounding the well, the scums, muds etc. coming from the clarifiers may collect comparatively free from juice. The convection currents formed by the steam coils will move upward in a spiral, owing to the rotary motion of the liquid in the tank, and there will be a corresponding current downward in the center. In this case we will have three natural laws at work, that is, gravitation, centrifugal motion, and convection currents caused by the steam, all of which will have an influence to bring the heavier particles to the center and bottom, and to cause the lighter particles to rise and be thrown outward.

The apparatus may be used to treat the juice as coming directly from the mill, or after the lime and sulfur have been added and before the juice is heated. In the latter case there is a perfect mixture of the lime with the juice and the bagassillo and mud are almost wholly removed.

For the former purpose it will not be necessary to have heating coils, but if desired heating coils may be used. With such coils the apparatus may be used to receive the scums, and mud, from the clarifiers or settling tanks, and by heating the scums and operating the rotary attachments the heavier parts will be thrown down into the well and then may be drawn off for the filter presses.

Or again, using steam coils, the apparatus may be used to receive the juice from the clarifiers just before being taken into the evaporators, and there again any solid matters, whether light or heavy, may be removed. In such cases a very fine mesh sieve may be used.

Finally, the syrup coming from the evaporators may be cleaned from any precipitate formed during the boiling.

If desired, filtering material may be placed in the annular trough A°.

In order to obtain the best results, the tank A should be circular in cross section, preferably either cylindrical or conical in shape, so that there may be an unimpeded rotary effect imparted to the liquid, while the liquid in the well or settling tank should be prevented from rotating, which can be readily accomplished by providing suitable baffle plates such as the arrangement I show in Fig. 5.

I do not mean to limit the invention to any particular depth or shape of tank, or to the depth of the well, or to other details of construction, except as particularly pointed out in the claims; but it will be obvious that various modifications might be made in the herein described apparatus, and in the construction, combination and arrangement of parts which could be used without departing from the spirit of my invention.

While I have described the apparatus as especially adapted for the treatment of saccharine solutions, such as juice from sugar cane, beets, or the like, it will be obvious that it may be used for separating solid materials from other liquids, with or without modifications.

Having thus described my invention what I claim and desire to secure by Letters Patent of the United States is:—

1. Apparatus for separating solid particles from liquid, comprising a main tank, a well at the bottom thereof, a sieve at the upper end of said tank, a trough exterior to said sieve, means for supplying liquid to said tank and for drawing off the filtered liquid from said trough, means for drawing off the solid particles from said well, and means for imparting a rotary motion to the liquid in said tank, substantially as described.

2. Apparatus for separating solid particles from liquid, comprising a main tank, a well at the bottom thereof, a sieve at the upper end of said tank, a trough exterior to said sieve, means for supplying liquid to said tank and for drawing off the filtered liquid from said trough, means for drawing off the solid particles from said well, and a hollow cone mounted in the axis of said tank and adapted to impart a rotary motion to the liquid contents thereof, substantially as described.

3. Apparatus for separating solid particles from liquid, comprising a main tank circular in cross section, a well at the bottom thereof, a vertical sieve at the upper end of said tank, an annular trough exterior to said sieve, means for supplying liquid to said tank and for drawing off the filtered liquid from said trough, means for drawing off the solid particles from said well, means for imparting a rotary motion to the liquid in said tank, and means for preventing the rotary motion of the liquid in said well, substantially as described.

4. Apparatus for separating solid particles from liquid, comprising a main tank circular in cross section, a well at the bottom thereof, a vertical sieve at the upper end of said tank, an annular trough exterior to said sieve, means for supplying liquid to said tank and for drawing off the filtered liquid from said trough, means for drawing off the solid particles from said well, a hollow cone mounted in the axis of said tank and adapted to impart a rotary motion to the liquid contents thereof, and means for preventing the rotary motion of the liquid in said well, substantially as described.

5. Apparatus for separating solid particles from liquid, comprising a main tank, a well at the bottom thereof, a sieve at the upper end of said tank, a trough exterior to said sieve, a heating coil in the bottom of said tank, means for supplying liquid to said tank and for drawing off the filtered liquid from said trough, means for drawing off the solid particles from said well, and means for imparting a rotary motion to the liquid in said tank, substantially as described.

6. Apparatus for separating solid particles from liquid, comprising a main tank, a well at the bottom thereof, a sieve at the upper end of said tank, a trough exterior to said sieve, a heating coil in the bottom of said tank, means for supplying liquid to said tank and for drawing off the filtered liquid from said trough, means for drawing off the solid particles from said well, and a hollow cone mounted in the axis of said tank and adapted to impart a rotary motion to the liquid contents thereof, substantially as described.

7. Apparatus for separating solid particles from liquid, comprising a main tank circular in cross section, a well at the bottom thereof, a vertical sieve at the upper end of said tank, an annular trough exterior to said sieve, a heating coil in the bottom of said tank, means for supplying liquid to said tank and for drawing off the filtered liquid from said trough, means for drawing off the solid particles from said well, means for imparting a rotary motion to the liquid in said tank, and means for preventing the rotary motion of the liquid in said well, substantially as described.

8. Apparatus for separating solid particles from liquid, comprising a main tank circular in cross section, a well at the bottom thereof, a vertical sieve at the upper end of said tank, an annular trough exterior to said sieve, a heating coil in the bottom of said tank, means for supplying liquid to said tank and for drawing off the filtered liquid from said trough, means for drawing off the solid particles from said well, a hollow cone mounted in the axis of said tank and adapted to impart a rotary motion to the liquid contents thereof, and means for preventing the rotary motion of the liquid in said well, substantially as described.

IRVING H. MORSE.